Aug. 31, 1965  F. B. PFEIFFER  3,203,315
MACHINE FOR MAKING SCREWS
Filed Oct. 25, 1963  2 Sheets-Sheet 1
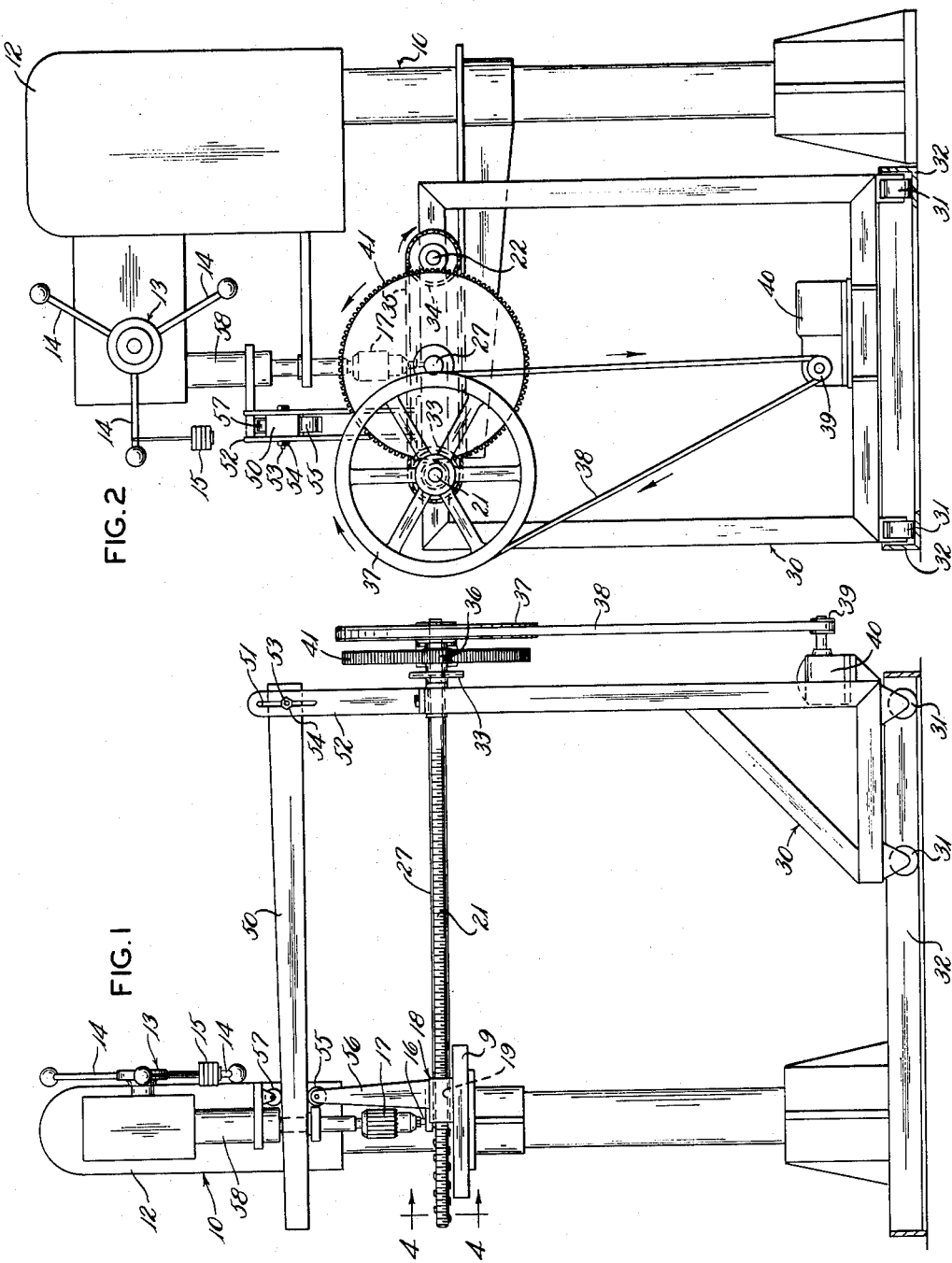
INVENTOR.
FRED B. PFEIFFER

United States Patent Office 3,203,315
Patented Aug. 31, 1965

3,203,315
MACHINE FOR MAKING SCREWS
Fred B. Pfeiffer, 270 Ferndale Ave., Akron, Ohio
Filed Oct. 25, 1963, Ser. No. 318,961
5 Claims. (Cl. 90—11.54)

This invention relates to machine tools and in particular relates to such tools for machining screws for plastic and rubber extruders and similar screws from rods of suitable diameter and material.

Machines for making screws are in an old and crowded art, however, before the present invention the operation of making extruder screws was expensive due to the original cost of the machines, time required to make a screw, distortion of the work during the forming of the screw, and the need of close attention of a machinist during the machines operation.

The present invention is an improvement over the prior art in that the original cost of the machine is low due to its simple design and being constructed generally of parts commercially available in the market; is more efficient due to support of the work piece at the machining station whereby the machining may be done at maximum speed; substantially eliminates distortion of the screw, by avoiding supporting the rod being machined between lathe centers; and by making it unnecessary for an attending machinist to be ever elert to back-away lathe centers to compensate for the expansion of a rod that results due to the machining operation.

The principal objects of the present invention are to overcome the unsatisfactory attributes of the prior art listed above.

Another object of the invention is to provide means adapted to prevent a machine tool in operation from moving away from its predetermined position relative to the work piece.

Still other objects and advantages of the invention will be apparent from he following description, taken with the accompanying drawings wherein:

FIG. 1 is a front elevational view of a machine embodying the present invention.

FIG. 2 is a right hand end view of the machine shown in FIG. 1.

Figure 3:
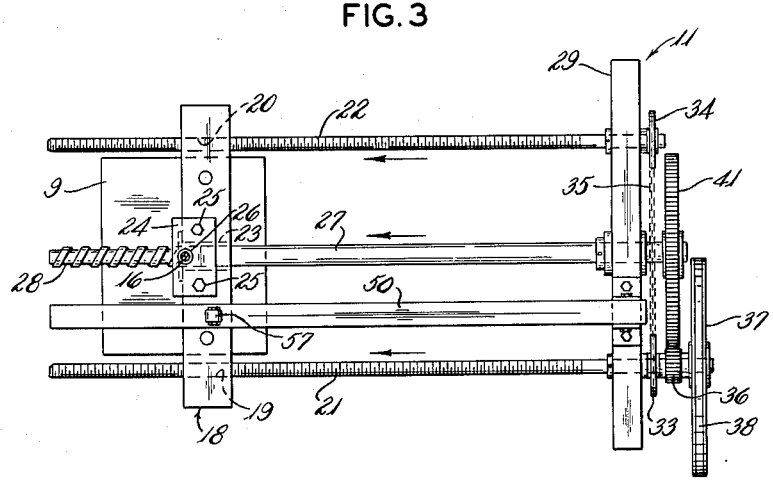
FIG. 3 is a top plan view of feeding mechanism adapted to feed a rod into contact with a rotating cutter and shown attached to a drill press table.

Referring now to the drawings in detail there is shown in FIG. 1 said machine referred to generally as 10 and comprising a substantially conventional drill press referred to generally as 12. The drill press has a depth feed 13 with arms 14 one of which has a weight 15 attached thereto. A rotating cutting tool 16, of desired shape, is retained in a chuck 17 as will be understood by those familiar with the art.

Figure 4:
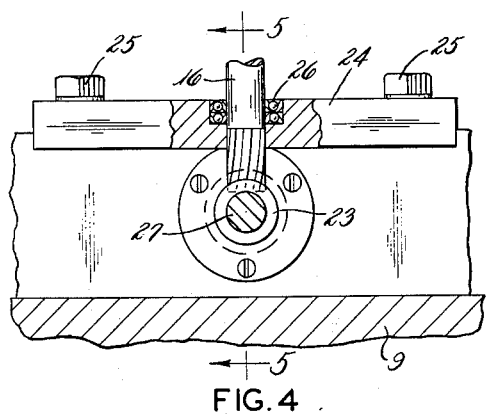
FIG. 4 is an enlarged fragmentary view taken on line 4—4 of FIG. 1 and illustrating the engagement of a cutting tool with a rod being machined.
Figure 5:
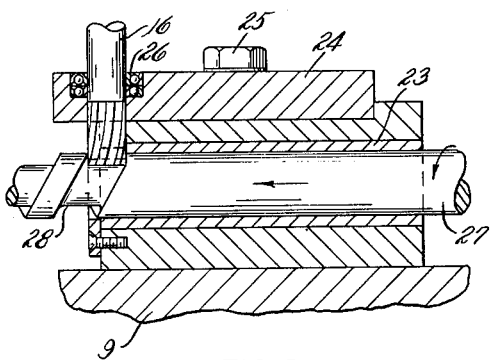
FIG. 5 is a view taken on line 5—5 of FIG. 4.

Feeding mechanism, referred to generally as 11, and best shown in FIG. 3 is attached to the drill press table 9 and comprise attachment member 18 bolted to the table. Member 18 is provided with tapped holes 19 and 20 adapted to receive in threaded relation feed screws 21 and 22 respectively. A bushing 23 (see FIGS. 4 and 5) is disposed in member 18. A tool bearing block 24 is attached to member 18 by bolts 25. A tool bearing 26 in block 24 is in sliding relation to tool 16 and is in close proximity to the cutting portion of the tool.

A work piece consists of a rod 27 of predetermined dimensions and in which grooves 28 are to be machined to form said extruder screw together with screws 21 and 22 are rotatably mounted in bearings in member 29 supported on a carriage 30. The carriage is movable on wheels 31 over track 32 the latter being rigidly attached to the base of the drill press 10.

Screws 21 and 22 project beyond member 29 as best shown in FIG. 3 and are provided with sprockets 33 and 34 respectively, these sprockets being connected by a driving chain 35. Screw 21 is provided with a change gear 36 and a pulley 37 driven by a belt 38 from a pulley 39 (see FIG. 2) on a gear reduction variable speed reversible motor 40 mounted on the movable carriage.

Rod 27 projects beyond member 29 and has mounted on its projected end change gear 41 in driven relation with gear 36. It is to be noted by reference to FIG. 3 that suitable thrust collars are provided for screws 21, 22 and rod 27 to prevent endwise motion relative to member 29 of carriage 30.

A cam bar 50 has one end adjustably mounted in a slot 51 in an upwardly extending arm 52 of the carriage. Means for holding the cam bar in fixed position in parallel relation with track 32 includes a bolt 53 and nut 54. The other end of the cam bar is supported on a roller 55 mounted in the top portion of a bracket 56 supported on attachment means 18. A cam follower 57 is attached to the movable spindle bearing 58 as illustrated and is held in contact with the cam surface by means of weight 15 on feed lever arm 13.

Operation

Initially the carriage 30 is positioned on its track so that the free end portions of screws 21 and 22 are engaged in tapped holes 19 and 20 respectively and may extend any desired distance therebeyond. Similarly the free end of cam bar 50 extends beyond its support roller 55. The free end of the work rod 27 initially is adjacent the cutting tool.

Cam bar 50 is adapted to control the depth of the cut and the cam surface, over which cam follower 57 rolls, may be modified to produce a groove having a gradual change of depth or having various depths, all of which will be manifest to those familiar with the art. Obviously, if a screw having uniform depth of the groove is being machined the cam bar may be omitted and the tool be controlled by the conventional tool feed of the drill press.

Bearing member 29 is drawn toward the drill press by screws 21, 22 rotating in their threaded relation with tapped holes 19 and 20 respectively. Screws 21, 22 are similarly threaded and rotated at the same speed. Work rod 27 is rotated and advanced to the rotating tool 16 by member 29 under the influence of screws 21, 22. The rotation of screws 21, 22 and rod 27 are effected by driven pulley 37, rotating screw 21 to which is directly attached sprockets 33, 34 mounted on screws 21, 22 and joined by chain 35. Work rod 27 is rotated by change gear 41 mounted on the end thereof and driven by change gear 36 mounted on the projecting end of driven screw 21. Since member 29 is rigidly attached to carriage 30 it will be seen that the carriage will be advanced on its tracks with member 29.

To produce an extruder screw of a given specification the rate of feed of the work to the cutting tool, the rotation of the work rod and the cam contour must be determined. Accordingly, for example, to produce a screw having 1" per thread lineal pitch, a diameter of 1¼" and a groove depth of ⅛" change gear 36 will have a ratio relating to change gear 41 of 10 to 1 and feed screws 21, 22 will have 10 threads per inch. The cam bar 50 will be adjusted to control the tool cut to ⅛" depth.

It will be manifest to those with mechanical skill that various gear combinations will permit the machining of screws of any desired pitch having either left or right hand threads.

The tool 16 of proper size and shape is rotated in a conventional manner by the drill press, however, the tool is held against wobble or movement away from its predetermined position by bearing 26 disposed in block 24 closely adjacent the tool's bite into the material being cut or machined. A further novel feature, important in the operation is the support of rod 27 at the machining station in bushing 23.

As is well known the heat generated by the machining will cause rod 27 to expand and in the prior art where the rod would be held between rigid centers the rod would buckle at its weakest place, namely, at the grooves. When such buckling or distortion occurs the finished screw must be straightened and this is an expensive operation. To prevent or reduce such distortion of the work piece when the machining was being done by prior art machines the machine operator had to be ever alert to back the centers away to accommodate for the expansion. In applicant's method and apparatus expansion from heat is not a problem since the expansion longitudinally of the work rod is unobstructed except between the tool 16 and member 29. The cut, however, accommodates such expansion while still remaining well within the tolerances required by commercial use of extruder screws.

A preferred embodiment of the invention has been illustrated, including a drill press, however, it is to be understood that the invention is not to be limited to the employment of a drill press, but contemplates the substitution of any tool operating device for the drill press that may be found satisfactory. Obviously the combining of the elements shown in FIGS. 3, 4 and 5 could be combined with various types of tool operating devices without departing from the spirit of the present invention. Accordingly it is desired to comprehend such modifications that may fall within the scope and spirit of the accompanying claims.

I claim:

1. A machine designed to machine spirally extending grooves in rods to form extruder screws and the like comprising in combination:
   (a) drill press,
   (b) carriage tracks extending from base of said press,
   (c) a carriage movable on said tracks,
   (d) a member fixidly mounted on the carriage and having bearing adapted to receive and retain parallel and rotatable therein a work piece in the form of a rod and a pair of screws,
   (e) said press having an attachment member attached to the table thereof, said member being provided with tapped holes adapted to receive in threaded relation said screws and having a bushing disposed therein adapted to receive in snug axially slidable relation said work piece,
   (f) a groove-machining rotary tool mounted in and actuated by said press,
   (g) the said attachment member having a bearing therein adapted to receive and stabilize said tool,
   (h) said attachment means having a bushing adapted to receive in sliding relation said work piece,
   (i) said bushing having a slot through which said tool extends to contact the work piece,
   (j) means adapted to simultaneously rotate said screws and work piece at predetermined speeds whereby the work piece is fed lengthwise to said tool at predetermined rate of advance and rotation, and
   (k) cam means adapted to control the depth of a groove of said screw.

2. In a machine for making screws comprising in combination:
   (a) a machine tool,
   (b) means for actuating the tool,
   (c) a carriage having a work piece in the form of a rod and a pair of screws mounted thereon,
   (d) attachment means mounted on said tool actuating means for attaching the carriage thereto and being adapted to draw the carriage toward the machine tool and feed the work piece to said tool,
   (e) said attachment means comprising tapped holes in threaded relation with said pair of screws,
   (f) means mounted on the carriage adapted to rotate said work piece and the pair of screws at predetermined rotative speeds to each other,
   (g) a bushing through which the work piece is adapted to slide and be supported thereby, said bushing being mounted in a member which in turn is mounted in a member that is in fixed relation to said tool actuating means, the bushing having a slot through which said tool projects to contact the work rod, and
   (h) a tool bearing block and a tool bearing mounted therein in sliding relation with the tool and being adapted to stabilize the tool against movement away from a predetermined position relative to the work piece.

3. A machine for cutting grooves in a rod to form a screw comprising in combination:
   (a) a rotary end tool,
   (b) tool actuating means,
   (c) means adapted to continuously feed the rod longitudinally thereof to the tool the length of that portion of the rod in which said grooves are to be cut,
   (d) said rod feeding means being removably attached to the tool actuating means and comprising:
      (1) carriage tracks attached to the base of the tool actuating means and a carriage movably on the tracks,
      (2) a bearing mounted on the carriage,
      (3) parallel screws and said rod mounted in said bearing, said screws being in threaded relation with attachment means on the tool actuating means,
      (4) means on the carriage adapted to rotate said rod and screws at predetermined rotative speeds relative to each other whereby the carriage is drawn toward the tool actuating means and the rod feed into contact with the tool, without interruption of the feed, and
   (e) an elongated cam mounted on and movable with the carriage into contact with the cam follower mounted on the tool actuating means whereby the depth of the groove being cut is controlled.

4. A machine for cutting grooves in a rod to form a screw comprising in combination:
   (a) a rotary end tool,
   (b) tool actuating means,
   (c) means adapted to continuously feed the rod longitudinally thereof to the tool the length of that portion of the rod in which said grooves are to be cut,
   (d) said rod feeding means being removably attached to the tool actuating means and comprising:
      (1) carriage tracks attached to the base of the tool actuating means and a carriage movably on the tracks,
      (2) a bearing mounted on the carriage,
      (3) parallel screws and said rod mounted in said bearing, said screws being in threaded relation with attachment means on the tool actuating means,
      (4) means on the carriage adapted to rotate said rod and screws at predetermined rotative speeds relative to each other whereby the carriage is drawn toward the tool actuating means and the rod feed into contact with the tool, without interruption of the feed,
   (e) a bushing through which the rod is adapted to slide in close association therewith and be supported thereby, said bushing being mounted in a member which in turn is mounted in a member that is fixed relative to said tool actuating means, the bushing having an opening through which said tool projects to contact the rod, and (f) an elongated cam mounted on and movable with the carriage into contact with the cam follower mounted on the tool actuating means whereby the depth of the groove being cut is controlled.

5. A machine for cutting grooves in a rod to form a screw comprising in combination:
(a) a rotary end tool,
(b) tool actuating means,
(c) means adapted to continuously feed the rod longitudinally thereof to the tool the length of that portion of the rod in which said grooves are to be cut,
(d) said rod feeding means being removably attached to the tool actuating means and comprising:
(1) carriage tracks attached to the base of the tool actuating means and a carriage movable on the tracks,
(2) a bearing mounted on the carriage,
(3) parallel screws and said rod mounted in said bearing, said screws being in threaded relation with attachment means on the tool actuating means, and
(4) means on the carriage adapted to rotate said rod and screws at predetermined rotative speeds relative to each other whereby the carriage is drawn toward the tool actuating means and the rod feed into contact with the tool, without interruption of the feed.

References Cited by the Examiner

UNITED STATES PATENTS

| | | | |
|---|---|---|---|
| 1,112,269 | 9/14 | Crellin et al. | 90—11.62 |
| 2,738,711 | 3/56 | Carlson et al. | 90—11.62 |

FOREIGN PATENTS

| | | |
|---|---|---|
| 589,989 | 3/26 | France. |

WILLIAM W. DYER, JR., *Primary Examiner.*

DONALD R. SCHRAN, *Examiner.*